United States Patent [19]

Barkow et al.

[11] 3,930,185

[45] Dec. 30, 1975

[54] DISPLAY SYSTEM WITH SIMPLIFIED CONVERGENCE

[75] Inventors: William Henry Barkow, Pennsauken; Josef Gross, Princeton, both of N.J.

[73] Assignee: RCA Corporation, New York, N.Y.

[22] Filed: May 20, 1974

[21] Appl. No.: 471,626

[52] U.S. Cl. ................ 315/370; 315/13 C; 315/371

[51] Int. Cl.² .......................................... H01J 29/70

[58] Field of Search .................. 315/370, 371, 13 C

[56] References Cited

UNITED STATES PATENTS

| | | | |
|---|---|---|---|
| 3,553,523 | 1/1971 | Budd | 315/13 C |
| 3,714,500 | 1/1973 | Kaashoek | 315/370 |
| 3,761,763 | 9/1973 | Saruta | 315/371 |
| 3,793,554 | 2/1974 | Rossaert | 315/370 |

*Primary Examiner*—Malcolm F. Hubler
*Assistant Examiner*—Richard E. Berger
*Attorney, Agent, or Firm*—E. M. Whitacre; Paul J. Rasmussen

[57] ABSTRACT

A large-screen wide-deflection angle color picture tube utilizes three coplanar electron beams. Convergence of horizontal lines on the picture tube viewing screen is accomplished by positioning a deflection yoke exhibiting particular astigmatism characteristics relative to the electron beams of the picture tube. Convergence of vertical lines is accomplished by energizing quadrupole magnetic field producing windings disposed about the picture tube neck at a vertical scanning rate.

7 Claims, 18 Drawing Figures

DISPLAY SYSTEM WITH SIMPLIFIED CONVERGENCE

BACKGROUND OF THE INVENTION

Figure 1:
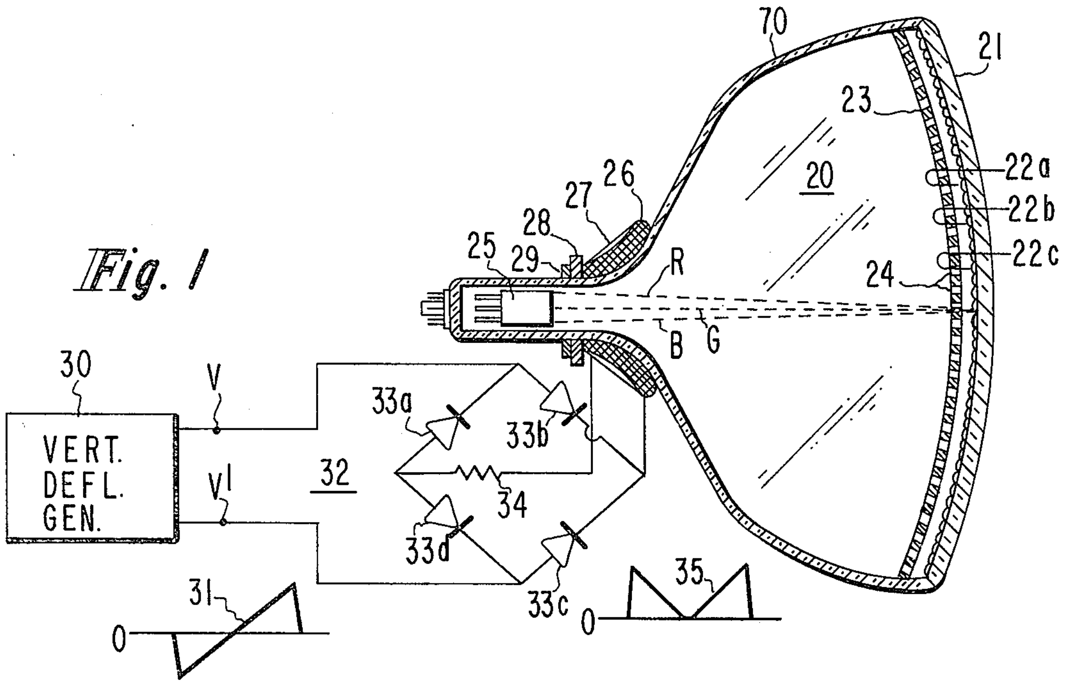

This invention relates to a color display system utilizing simplified convergence for converging three coplanar beams of a color picture tube.

In the past convergence of the beams of color picture tubes generally has been accomplished by the use of magnetic pole pieces disposed within the neck of a picture tube in such a manner as to influence the beams and energized by external electromagnets driven by convergence correction waveforms at both the line and field scanning rates. This is commonly referred to as on-axis dynamic convergence correction. Additionally, sometimes to correct corner misconvergence it has been necessary to utilize further correction waveforms derived by combining the line and field rate waveforms. Obviously, structure of this type is expensive and usually requires the adjustment of many controls to properly converge the beams.

Color picture tubes utilizing coplanar beams horizontally disposed, and particularly in conjunction with vertically disposed phosphor stripes on the viewing screen, have enabled the use of dynamic convergence arrangements which are simpler than the above-described arrangements utilized with picture tubes having delta electron beam configurations and dot phosphor elements arranged in triad groupings. It is known that quadrupole magnetic field producing windings may be utilized in conjunction with the deflection yoke to achieve convergence of the coplanar beams. However, in most cases, the quadrupole windings must be energized by both line and field rate waveforms and a number of adjustable control elements utilized to achieve the desired convergence of the beams. Alternatively, in addition to a quadrupole winding, the scanning current through the actual deflection windings may be proportioned to achieve convergence, but this approach also requires a number of adjustable controls, all of which add to the cost and complexity of manufacturing and servicing.

In U.S. Pat. No. 3,800,176 entitled "SELF-CONVERGING COLOR IMAGE DISPLAY" and issued Mar. 26, 1974, to the present inventors, a system is described which provides convergence of three coplanar beams of a color picture tube without the use of any dynamic convergence apparatus. That patent discloses that in relatively large viewing screen size picture tubes, such as tubes having a viewing screen diagonal dimension of about 25 inches, it may be desirable to utilize some form of simplified dynamic convergence arrangement to achieve substantial convergence of the beams at all points on the viewing screen. Such an arrangement is provided by the present invention.

In accordance with the invention, a display system utilizing simplified convergence is provided. A color picture tube includes a viewing screen containing three different color phosphor elements and an electron gun assembly for producing three coplanar electron beams. Static convergence means are disposed relative to the picture tube for converging the three electron beams at the central region of the viewing screen. A deflection yoke disposed in operating relation about the neck portion of the picture tube includes vertical and horizontal deflection coils. The winding distribution of the horizontal coils is selected for producing negative horizontal isotropic astigmatism for substantially converging vertical lines along the horizontal deflection axis and the winding distribution of the vertical coils is selected for causing horizontal lines to be substantially parallel. Means are included for positioning the yoke relative to the picture tube for substantially converging horizontal lines at all points on the screen and for substantially converging vertical lines along the horizontal deflection axis. Coil winding portions are disposed about the neck portion of the picture tube for producing a quadrupole magnetic deflection field within the neck portion and means are provided for energizing the coil winding portions with energy at the vertical scanning rate for converging vertical lines such that the three beams are substantially converged at all points on the viewing screen.

Figure 2A:
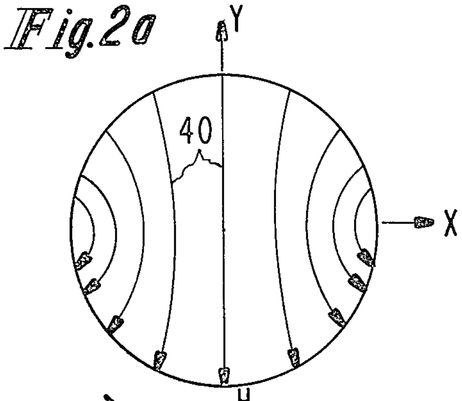
Figure 2B:
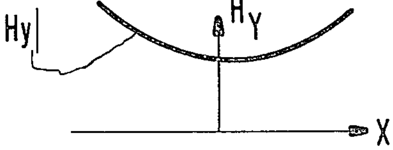
Figure 3A:
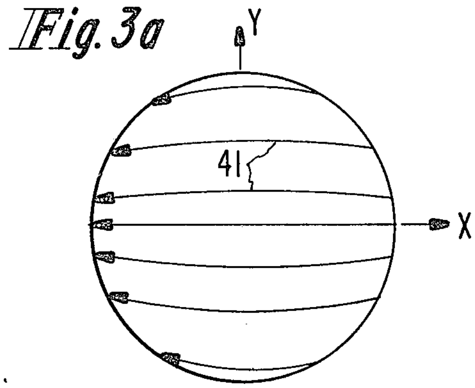
Figure 3C:
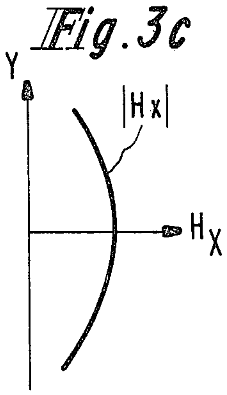
Figure 3B:
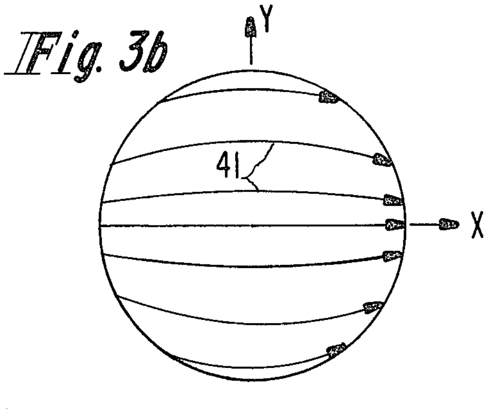
Figure 5A:
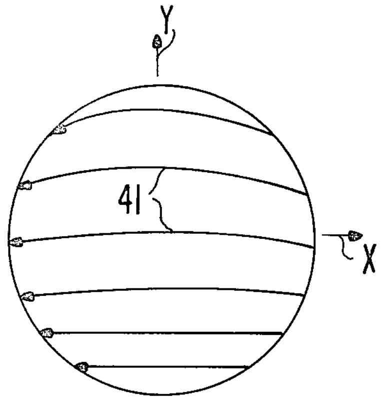
Figure 5C:
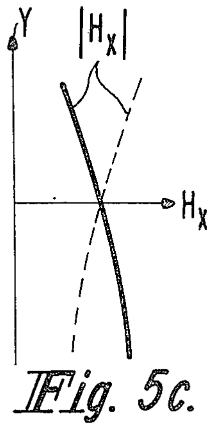
Figure 5B:
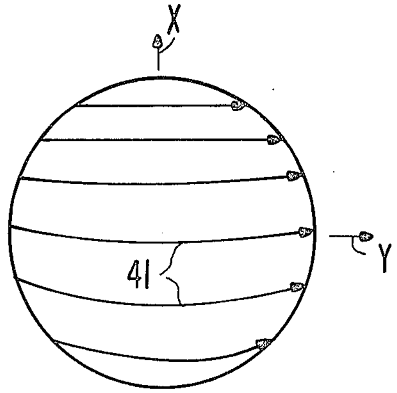
Figure 4:
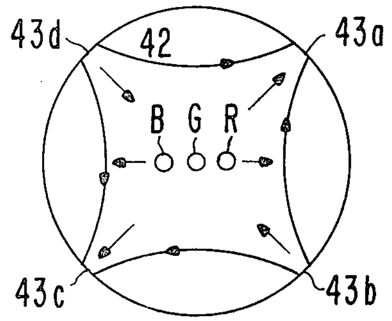
Figure 6:
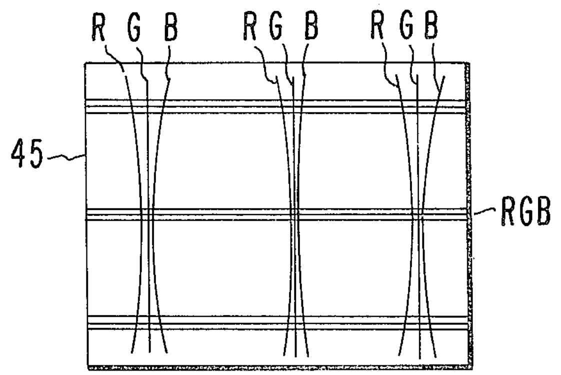
Figure 7:
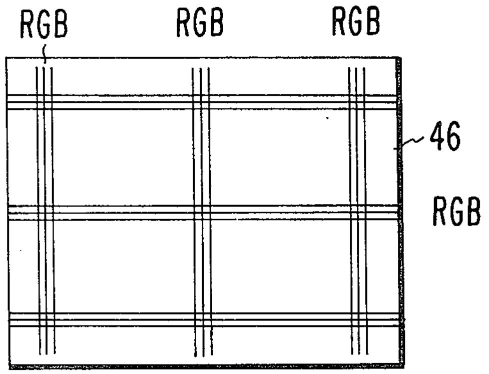
Figure 10:
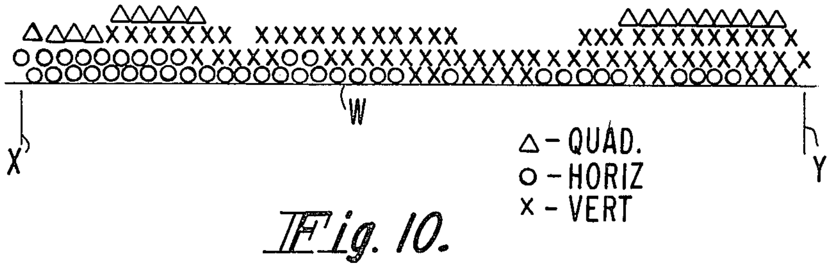
Figure 11:
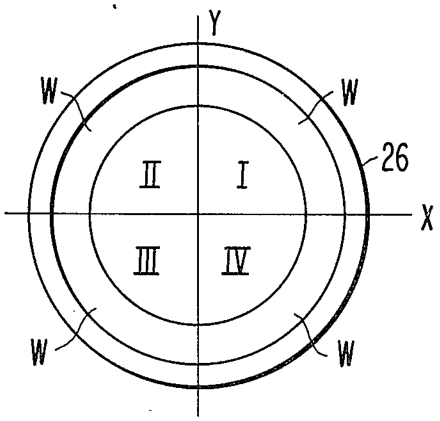

A more detailed description of the invention is given in the following specification and accompanying drawings of which:

FIG. 1 is a sectional view and schematic drawing of a display system embodying the invention;

FIGS. 2*a* and 2*b* illustrate characteristics of horizontal deflection windings utilized as part of the invention;

FIGS. 3*a*, 3*b* and 3*c* illustrate characteristics of vertical deflection windings utilized as part of the invention;

FIG. 4 illustrates a quadrupole magnetic field utilized in the operation of a display system according to the invention;

FIGS. 5*a*, 5*b* and 5*c* illustrate characteristics of combined quadrupole and vertical deflection magnetic fields utilized in the operation of a display system according to the invention;

FIGS. 6 and 7 illustrate line pattern characteristics obtained on the viewing screen of a color picture tube utilized in a system according to the invention;

FIGS. 8*a*, 8*b* 8*c* and 9 illustrate several arrangements for producing a quadrupole magnetic field utilized in the operation of a system according to the invention;

FIG. 10 illustrates the conductor distribution of a quadrant of a deflection yoke utilized as part of the invention; and FIG. 11 illustrates graphically the arrangement of the conductor distribution of a deflection yoke utilized as part of the invention.

DESCRIPTION OF THE INVENTION

FIG. 1 is a top sectional view and a schematic drawing of a display system embodying the invention. A color picture tube 20 includes a glass envelope 70 and a faceplate 21. Deposited on the inside of the surface of faceplate 21 are a series of repeating groups of blue, green and red phosphor elements 22*a*, 22*b* and 22*c*. Disposed in the neck region of picture tube 20 is an electron gun assembly 25 which produces three coplanar horizontal beams B, G and R which pass through apertures 24 of an aperture mask 23 to impinge upon the respective color phosphor elements. Disposed around the neck region of picture tube 20 is a deflection yoke including a ferrite core 26 having wound thereon conductors 27 forming the vertical and horizontal deflection coils. The deflection yoke itself may include quadrupole magnetic field producing conductors which will be described subsequently. Located behind the deflection yoke about the neck of the picture tube is a static convergence assembly 28 which may be of any suitable type producing adjustable quadrupole and hexapolar fields for aligning the two outside ones of the electron beams relative to the center electron beam. Such an arrangement is described in more detail in U.S. Pat. No. 3,725,831. Located behind static convergence assembly 28 is a color purity adjusting device 29. This device may comprise two rotatable metal rings, each of which is magnetized with opposite poles across its diameter. It is to be understood that the static convergence assembly 28 and color purity assembly 29 may be separate assemblies as illustrated here or may be combined in one unit. The color purity ring assembly 29 serves to move all three of the in-line beams together.

Coupled to the quadrupole winding arrangement is a circuit 32 for energizing the quadrupole windings. A vertical deflection generator 30, of a conventional design, produces the scanning current illustrated by waveform 31 for the vertical deflection coils, is also coupled to the diode bridge comprising diodes 33*a*, 33*b*, 33*c* and 33*d* poled and interconnected as shown. The junction of the anodes of diodes 33*a* and 33*d* is coupled through a resistor 34 to one end of the series-connected quadrupole windings. The other end of the quadrupole windings is coupled to the junction of the cathodes of diodes 33*b* and 33*c*. In a well-known manner the diode bridge converts the linear sawtooth current waveform 31 into a waveform 35 which approximates a parabola. This parabolic current waveform 35 is suitable for energizing the quadrupole windings for producing the desired magnetic fields which will be described subsequently. Although not shown, it is to be understood that the horizontal deflection coils of the deflection yoke are energized by scanning current produced by a suitable conventional horizontal deflection generator.

FIG. 2*a* illustrates the horizontal deflection field produced by the horizontal deflection coils of the deflection yoke shown in FIG. 1. It is noted that the winding distribution of the horizontal deflection coils is selected for producing a pincushion shaped magnetic field illustrated by the magnetic flux lines 40. This magnetic field is weakest in the center and gets progressively stronger towards each of the ends in the horizontal direction. This field produces negative horizontal isotropic astigmatism of the magnitude required to converge vertical lines along the horizontal deflection axis as observed on the viewing screen of the picture tube of FIG. 1 when a conventionally generated cross-hatch line test pattern is displayed on the tube.

FIG. 2*b* illustrates the relative magnitude of this deflection field as shown by the curve $H_Y$. Again, it is noted that this magnetic field is stronger at the edges of the X or horizontal deflection axis than it is at the center.

FIG. 3*a* illustrates a deflection field comprising magnetic flux lines 41 produced by the vertical deflection coils of the yoke of FIG. 1 which serves to deflect the electron beams in a vertical direction. As can be seen from FIG. 3*a*, the lines of flux 41 are more concentrated near the horizontal center line of the figure than they are at the top and bottom portions of the figure. Thus, the magnetic field illustrated in FIG. 3*a* acts on the beams in the top half of the raster.

FIG. 3*c* illustrates a curve $H_X$ representative of the strength of the vertical magnetic field as a function of its distance from the center of the vertical deflection axis Y.

FIG. 3*b* illustrates the vertical deflection field produced by the vertical deflection coils for deflecting the beams in the bottom half of the scanned raster. This deflection field has the same characteristic as the field illustrated in FIG. 3*a* except that its direction is reversed. The lines of flux 41 are more concentrated at the center of the raster and have the least concentration or least strength near the top and bottom portions of the scanned raster. The curve $H_X$ of FIG. 3*c* also illustrates the concentration of flux in the field illustrated in FIG. 3*b*.

FIG. 4 illustrates a quadrupole magnetic deflection field comprising flux lines 42 which is produced by the quadrupole winding arrangement utilized in FIG. 1. The quadrupole field is more simply represented by the arrows which point radially in relation to the four poles 43*a*, 43*b*, 43*c* and 43*d* separated, generally, by approximately 90° one from another and approximately 45° from the horizontal and vertical deflection axes. However, it should be understood that different angular separations might be required with other yoke winding distributions. The effect of the quadrupole field is to separate the blue and red beams in respective directions away from the center green beam. This effect on the beams is a feature of the simplified convergence assembly of the display system according to the invention.

FIGS. 5*a* and 5*b* illustrate the combined vertical deflection field and the quadrupole deflection field. In FIG. 5a it is noted that the lines of flux 41 are more concentrated and are straighter at the bottom portion of the raster and get increasingly bowed and less concentrated in a direction towards the top of the raster. The field in FIG. 5*a* deflects the three electron beams in the top half of the raster. The strength of this deflection field is illustrated by the solid line curve $H_X$ in FIG. 5*c*. It can be seen that in the upper part of the raster the amount of flux is less than in the bottom half of the raster, top and bottom being defined with respect to the X or horizontal axis.

FIG. 5*b* shows the combined vertical deflection and quadrupole deflection fields which influence the beams in the bottom half of the raster. In FIG. 5*b* lines of flux 41 are straighter and more concentrated at the top of the raster and are more bowed and less concentrated towards the bottom of the raster. The field strength $H_X$ is illustrated by the dotted curve $H_X$ of FIG. 5*c*.

FIG. 6 illustrates the characteristics of lines of a cross-hatch pattern obtained when a suitable test signal is applied to the conventional signal processing circuits of a television receiver utilizing the display system according to the invention. Particularly, FIG. 6 illustrates the line pattern obtained as a result of the deflection fields illustrated in FIGS. 2*a*, 3*a* amd 3*b* without the addition of the quadrupole magnetic deflection field but with the yoke disposed in operating relation about the neck of the picture tube. It is seen that the horizontal red, green and blue lines are parallel to each other and are converged in a vertical direction at all points of the raster. The small spacings of the line are merely to illustrate clearly that there are three lines which are essentially superimposed. The vertical red, green and blue lines are converged along the horizontal deflection axis but are not converged at the top and bottom portions of the raster. It is noted that the separation of the red, green and blue lines is greater at the left and right top and bottom portions than at the center top and bottom portions of the raster. As described in the above-mentioned U.S. Pat. No. 3,800,176, the deflection yoke is adapted to be moved slightly relative to the picture tube for aligning the magnetic deflection field of the yoke relative to the beams for producing the converged condition of the horizontal lines and the converged condition of the vertical lines along the horizontal axis. Additionally, it may be desirable to provide a tilt adjustment for the deflection yoke to aid in obtaining desired convergence. It should be noted that any suitable conventional deflection yoke mount providing for axial, rotational, transverse and tilting (if desired) motion of the yoke, and means for securing the yoke in the desired position, may be utilized in practicing the invention. The horizontal deflection coils are designed for substantially converging vertical lines along the horizontal deflection axis. The winding distribution of the vertical coils is selected for causing the horizontal lines to be substantially parallel at all points of the raster.

FIG. 7 illustrates the condition of vertical and horizontal lines with the addition of the quadrupole magnetic field to the previous arrangement which achieved the line conditions illustrated in FIG. 6. In FIG. 7 it can be seen that the vertical lines as well as the horizontal lines have been converged. Simply stated, the deflection coils are designed and the yoke is positioned relative to the picture tube to achieve convergence of the horizontal lines at all points of the raster and convergence of the vertical lines along the horizontal deflection axis. The vertical deflection coils are further designed to minimize anisotropic astigmatism, sometimes referred to as trap. A trap condition exists when the rasters produced by the separate outside two beams are trapezoidal in nature rather than rectangular. The coils can be designed to effectively eliminate this trap with, however, the compromise that the beams are overconverged at the top and bottom of the raster, as illustrated in FIG. 6. The addition of the quadrupole magnetic deflection field converges the overconverged vertical lines so that the beams, as most easily seen by the lines of the cross-hatch pattern are substantially converged at all points of the scanned raster, as illustrated in FIG. 7.

In regard to defining vertical, or horizontal, lines displayed on the viewing screen of the picture tube as being substantially parallel, it is noted that most television receivers display some degree of pincushion distortion even though pincushion correction circuits are utilized. Pincushion distortion has the effect of bowing the lines. Substantially parallel bowed lines would then actually be two or more curves which are substantially equally spaced from each other. Furthermore, there may be some slight degree of crossing of the lines, but not so much as to cause an unacceptable picture display. Such slightly crossed lines are also considered herein as being substantially parallel.

A discussion of the term "substantial convergence" will now be given. It is common practice for a television receiver manufacturer to set a misconvergence limit requirement in the design specifications of a particular television receiver. It is always desirable to keep the misconvergence as close to zero as possible. Misconvergence may be observed as the separation of ideally superimposed red, green and blue lines as a conventional cross-hatch line pattern test signal is applied to the receiver. A misconvergence design goal is usually set by mounting a number of components such as the deflection yoke, static convergence assembly and quadrupole field producing windings on a number of picture tubes, all components taken from satisfactory production runs, and determining the average measured misconvergence. This average figure is just that and forms the basis of the design goal. In the present invention utilizing toroidal deflection coils, the average misconvergence is in the order of 60 mils at the worst places in the raster. The use of saddle type deflection coils or the combination of saddle and toroidal deflection coils in the yoke may raise the average misconvergence to about 90 mils. Of course, it is to be understood that different manufacturers set different design goals and some receivers will exhibit more or less misconvergence than the average figure. Furthermore, the condition of adjustment of the components will necessarily affect the amount of misconvergence so it is to be understood that the invention may be utilized in television receivers exhibiting almost no misconvergence or misconvergence as high as 125 mils or more.

Figure 9:
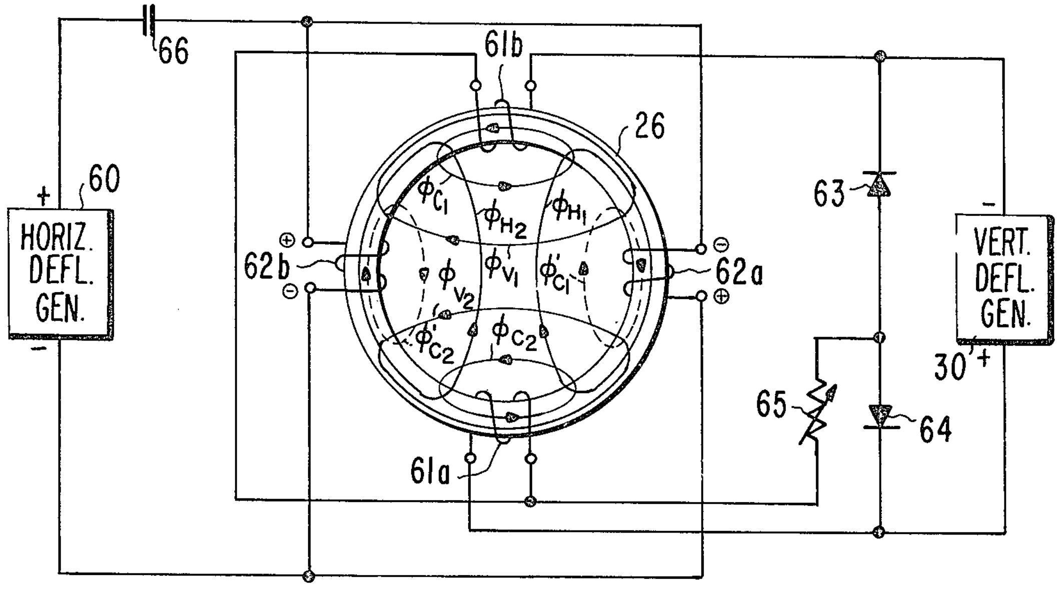

FIG. 9 is a schematic drawing of an arrangement for producing a quadrupole magnetic deflection field by unbalancing the scanning current in the vertical deflection coils. The yoke core 26 has wound around it a pair of vertical deflection coils 61*a* and 61*b* and a pair of horizontal deflection coils 62*a* and 62*b*. The horizontal coils are coupled in parallel and are coupled through an S-shaping capacitor 66 to a conventional horizontal deflection generator 60. The vertical coils are series-coupled to a conventional vertical deflection generator 30. Series-connected back-to-back diodes 63 and 64 are coupled across the terminals of vertical generator 30. The junction of the anodes of diodes 63 and 64 is coupled through a current control potentiometer to a common terminal of vertical coils 61*a* and 61*b*. For a discussion of the operation of the circuit it is presumed that the polarities of the vertical and horizontal scanning currents are as indicated at the respective generator output terminals.

Ignoring the interconnection of diodes 63 and 64 and potentiometer 65 in the circuit, the vertical scanning current through coils 61*a* and 61*b* produces the vertical deflection field illustrated by flux lines $\Phi_{V2}$ and $\Phi_{V1}$. The horizontal scanning current through coils 62*a* and 62*b* produces a horizontal deflection field illustrated by flux lines $\Phi_{H1}$ and $\Phi_{H2}$. Normally, the vertical deflection fields produced by coils 61*a* and 61*b* are symmetrical with respect to each other because the scanning current through both is equal. It has been determined that by unbalancing the current in coils 61*a* and 61*b* a quadrupole field may be generated which is suitable for converging the unconverged top and bottom portions of vertical lines, which unconverged lines are illustrated and discussed in conjunction with FIG. 6. The requisite unbalancing is provided by the interconnection of diodes 63 and 64 and potentiometer 65 in the circuit.

The flux field illustrated in FIG. 9 is for the top right hand portion of the raster and will be described. The flux field affecting the beams in other raster portions can be determined in a similar manner. Scanning current flows from the + terminal of vertical generator 30 through coil 61*a*, potentiometer 65 and diode 63 to the negative terminal of generator 30. Diode 64 is reverse biased. Scanning current also flows from the + terminal through coil 61*a* and coil 61*b* to the negative terminal. Thus, potentiometer 65 and diode 63 provide a path for scanning current which is in shunt with coil 61*b*. Coil 61*a* receives the full amount of scanning current. The adjustment of potentiometer 65 determines the current through coil 61*b* and hence the unbalance of current between coils 61*a* and 61*b*. The decrease in current through coil 61b decreases the flux $\Phi_{V1}$ and this is equivalent to an opposing correcting flux $\Phi_{C1}$ linking coil 61*b* and an aiding correction flux $\Phi_{C2}$ generated by coil 61*a*. Thus, if $\Phi_{V1}$ is less than $\Phi_{V2}$, then a net common deflecting flux for the two coils, $\Phi_V$, is equal to $$\frac{\Phi_{V1} + \Phi_{V2}}{2}$$

and $\Phi_{C1}$ equals $$\frac{\Phi_{V2} - \Phi_{V1}}{2}$$

equals $\Phi_{C2}$. The actual flux in the top portion of the raster, $\Phi_{V1}$, equals $\Phi_V - \Phi_{C1}$ and the actual flux in the bottom portion of the raster, $\Phi_{V2}$, equals $\Phi_V + \Phi_{C2}$.

If the parallel circuit of horizontal coils 62*a* and 62*b* were opened by breaking a connection, the two correcting fluxes $\Phi_{C1}$and $\Phi_{C2}$ are equal and are aiding and trapped within the core 26. This total correction flux $\Phi_C$, which is then equal to $\Phi_{C1}$ and equals $\Phi_{C2}$, induces equal voltages in coils 62*a* and 62*b* of the polarity as indicated by the circled polarity notations. However, when the horizontal coils are connected in parallel as shown in FIG. 9, the equal and opposite voltages across coils 62*a* and 62*b* cancel. Thus, these coils act to short out the voltage induced by the correcting flux $\Phi_C$. This results in equal and opposing flux $\Phi'_{C1}$ and $\Phi'_{C2}$ in the horizontal coils 62*a* and 62*b*. The end result is the four correcting flux components, $\Phi_{C1}$, $\Phi_{C2}$, $\Phi'_{C1}$ and $\Phi'_{C2}$ forming the required quadrupole magnetic deflection field for converging the vertical lines appearing on the raster.

When the beams are in the bottom portion of the raster, diode 64 conducts and coil 61*a* receives less than the full amount of scanning current, again the same configuration of quadrupole field, with the flux directions of $\Phi_{C1} = \Phi_{C2}$ and $\Phi'_{C1} = \Phi'_{C2}$ as illustrated in FIG. 9 is set up.

Figure 8A:
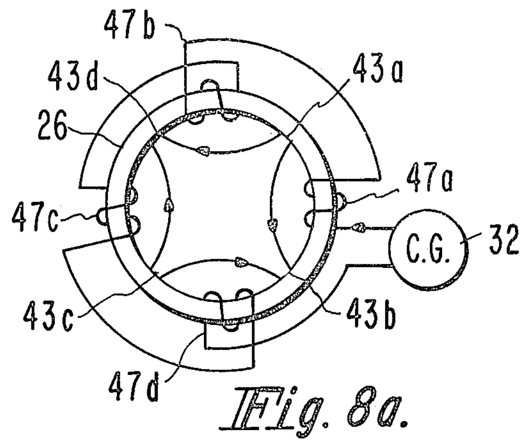
Figure 8B:
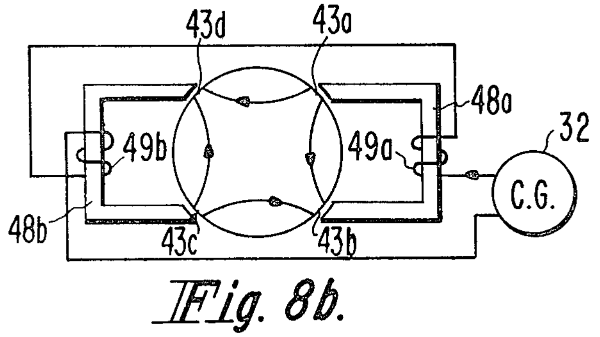
Figure 8C:
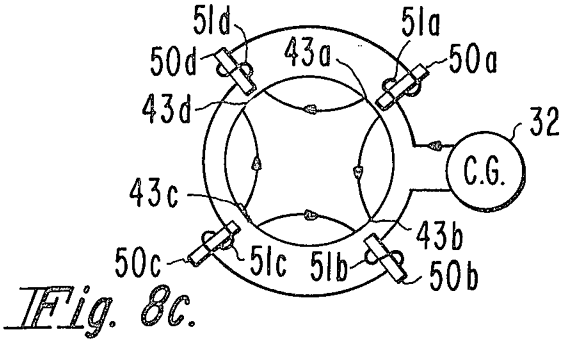

FIGS. 8*a*, 8*b* and 8*c* illustrate several arrangements for producing a quadrupole magnetic field utilized in the simplified convergence display system according to the invention.

In FIG. 8*a* a toroidal deflection yoke core 26 has wound about it four quadrupole winding portions 47*a*, 47*b*, 47*c*, and 47*d*, all of them series connected between the output terminals of a correction generator 32. Correction generator 32 may be similar to the correction generator 32 illustrated in FIG. 1 for producing a parabolic current wave at the vertical deflection rate for energizing the quadrupole windings. It should be understood that the quadrupole winding arrangements described in this and the other figures may utilize current waveforms other than purely parabolic waveforms. For example, a sawtooth waveform may be combined with the parabolic waveform. The current through the windings 47*a*–47*d* produces flux lines as indicated, thus forming the desired quadrupole deflection field.

FIG. 8*b* illustrates another version of a quadrupole deflection field-producing apparatus. Two C-shaped core members 48*a* and 48*b* are disposed horizontally on opposite sides of the neck portion of the picture tube behind the deflection yoke. Two coil winding portions 49*a* and 49*b* are wound around core members 48*a* and 48*b* respectively and are series connected between the output terminals of the correction generator 32. The correction current through the coils 49*a* and 49*b* produces a flux field which is the desired quadrupole magnetic deflection field.

FIG. 8*c* shows another embodiment of a quadrupole deflection-field-producing apparatus. Four permeable material core members 50*a*, 50*b*, 50*c* and 50*d* are mounted radially at the rear portion of the deflection yoke so they won't distort the deflection field produced by the yoke. They are mounted, for example, by a mounting ring secured to the deflection yoke and are positioned on diametrically opposite sides of the yoke and spaced 90° from each other, and 45° from the vertical and horizontal deflection axes of the yoke in this embodiment. By being mounted on the yoke, the quadrupole field will move in unison with the deflection field as the yoke is moved. Wound about the core members 50*a*–50*d* are coils 51*a*–51*d*, respectively. These coils are series connected between the output terminals of a correction generator 32. The correction current produced by generator 32 and flowing through the coils 51*a*–51*d* produces the required quadrupole deflection field.

FIGS. 8*a*, 8*b*, 8*c* and 9 illustrate four different arrangements for producing the required quadrupole fields. Their respective structures may be wound on the deflection yoke as separately energized coil sections or their field may be generated by parts of the deflection windings or they may be mounted at the rear or adjacent the rear of the deflection yoke. Obviously, other arrangements for producing quadrupole fields may also be advantageously utilized in practicing the invention.

FIG. 10 illustrates the conductor winding distribution in one quadrant of a toroidal deflection yoke utilized as part of the invention. The reference lines *x* and *y* represent the horizontal and vertical deflection axis, respectively, of the toroidal deflection yoke which may be the deflection yoke of FIG. 1. As indicated in FIG. 10, the conductors indicated by a circle form the horizontal field producing deflection coils. The conductors indicated by an *x* are representative of the vertical field producing deflection coils. The conductors indicated by a triangle are the conductors which form separate quadrupole field-producing coil winding portions which are toroidally wound about the core of the toroidal yoke. As illustrated in FIG. 10, there are in this embodiment four layers of conductors which are spaced and positioned as illustrated for forming the desired coil winding portions. The particular winding distribution illustrated is suitable for use with a picture tube having a deflection angle of 110° and a viewing screen diagonal size of 25 inches.

FIG. 11 illustrates graphically the arrangement of the conductor distribution *w* of a deflection yoke utilized in conjunction with the invention. It is noted that the portion *w* in each of the quadrants I–IV is the same as shown in FIG. 10. Each section extends circumferentially around the core perimeter from the *x* to the *y* axis in each of the quadrants. These conductors are toroidally wound about the ferrite core 26. The return conductors which would appear on the outside perimeter of core 26 are not indicated in FIG. 11.

In the arrangement of the invention described herein utilizing the 110° deflection angle picture tube having a viewing screen diagonal measurement of 25 inches, it was discovered that certain arrangements yielded a particularly efficient display system. Specifically, it was found that the physical length of the deflection core could be made shorter than the core of previous yokes utilized on this type tube with an increase in horizontal sensitivity and a large saving in ferrite material. This saving was redeployed as additional vertical conductor turns. The end result was a reduction in the consumption of power by the vertical deflection arrangement in the order of 5–6 watts. The shorter length of the core, which in one example was about 10 percent shorter than the cores of the prior arrangements, also requires less length of copper conductors for a given number of conductor turns, which improves the L/R ratio of the coils.

it was also discovered that reducing the core length did not impair the electron-optical performance of a yoke with coils wound according to the invention on such a short core. The resulting compact yoke has the advantage of reducing the range of the external yoke field. In yokes with longer cores, such external fields cause undesirable interference or coupling with other parts of the TV receiver.

It was further discovered that positioning the electron gun assembly further forward in the neck of the picture tube to a location where its final shield assembly was just about clear of the rear of the deflection yoke in its most rearward pull-back position, did not materially reduce the deflection sensitivity of the system, but contributed to a greater resolution because the resulting compact display system reduces the electron-optical magnification of the beam-focusing lenses.

The electron gun assembly, which may advantageously be fitted within the neck portion of a picture tube having a neck dimension of 29 millimeters, is generally of the type described in U.S. Pat. No. 3,800,176 with, however, the difference that some of the apertures in its beam-forming regions of the electron guns are somewhat elliptical in shape rather than round. This electron gun assembly also uses at least one common beam-forming aperture electrode which provides a precision structure for producing a relatively precise landing of the beams for reducing the amount of beam landing correction required.

What is claimed is:

1. A display system utilizing simplified convergence, comprising:

a color picture tube including an electron gun assembly for producing three coplanar beams;

static convergence means disposed relative to said picture tube for converging said three beams at the central region of the viewing screen of said picture tube;

a deflection yoke disposed in operating relation about the neck portion of said picture tube, said yoke including vertical and horizontal deflection coils for causing said beams to scan a raster, the winding distribution of said horizontal coils selected for producing negative horizontal isotropic astigmatism for substantially converging vertical lines along the horizontal deflection axis and the winding distribution of said vertical coils selected for causing horizontal lines to be substantially parallel;

means for positioning said yoke relative to said tube for aligning the magnetic deflection field of said yoke relative to said beams for substantially converging horizontal lines at all points on said screen and for substantially converging vertical lines along the horizontal deflection axis;

coil winding portions disposed about the neck portion of said picture tube for producing a quadrupole magnetic deflection field within said neck portion of said tube; and means for energizing said coil winding portions with energy at the vertical scanning rate for converging vertical lines such that said beams are substantially converged at all points on said viewing screen.

2. A display system according to claim 1 wherein said quadrupole field producing means comprises four winding portions symmetrically disposed relative to the respective ends of the vertical and horizontal deflection axes of said yoke.

3. A display system according to claim 2 wherein said vertical deflection coils are toroidally wound in said yoke.

4. A display system according to claim 3 wherein said picture tube includes a viewing screen comprised of repeating groups of three different color phosphor strips extending in a vertical direction.

5. A display system according to claim 4 wherein said means for energizing said quadrupole coil winding portions includes means for producing parabolic waveforms at said vertical scanning rate.

6. A display system according to claim 5 wherein said vertical deflection coils have the winding distribution thereof selected for producing a magnetic field which overconverges said beams along vertical lines in the absence of current in said quadrupole coil winding portions.

7. A display system according to claim 6 wherein said quadrupole windings are energized at the vertical deflection rate only.

* * * * *